July 2, 1963 R. HARDIGAN 3,096,052
PRE-SPINNING OF AIRCRAFT LANDING WHEELS
Filed Jan. 25, 1961 3 Sheets-Sheet 1
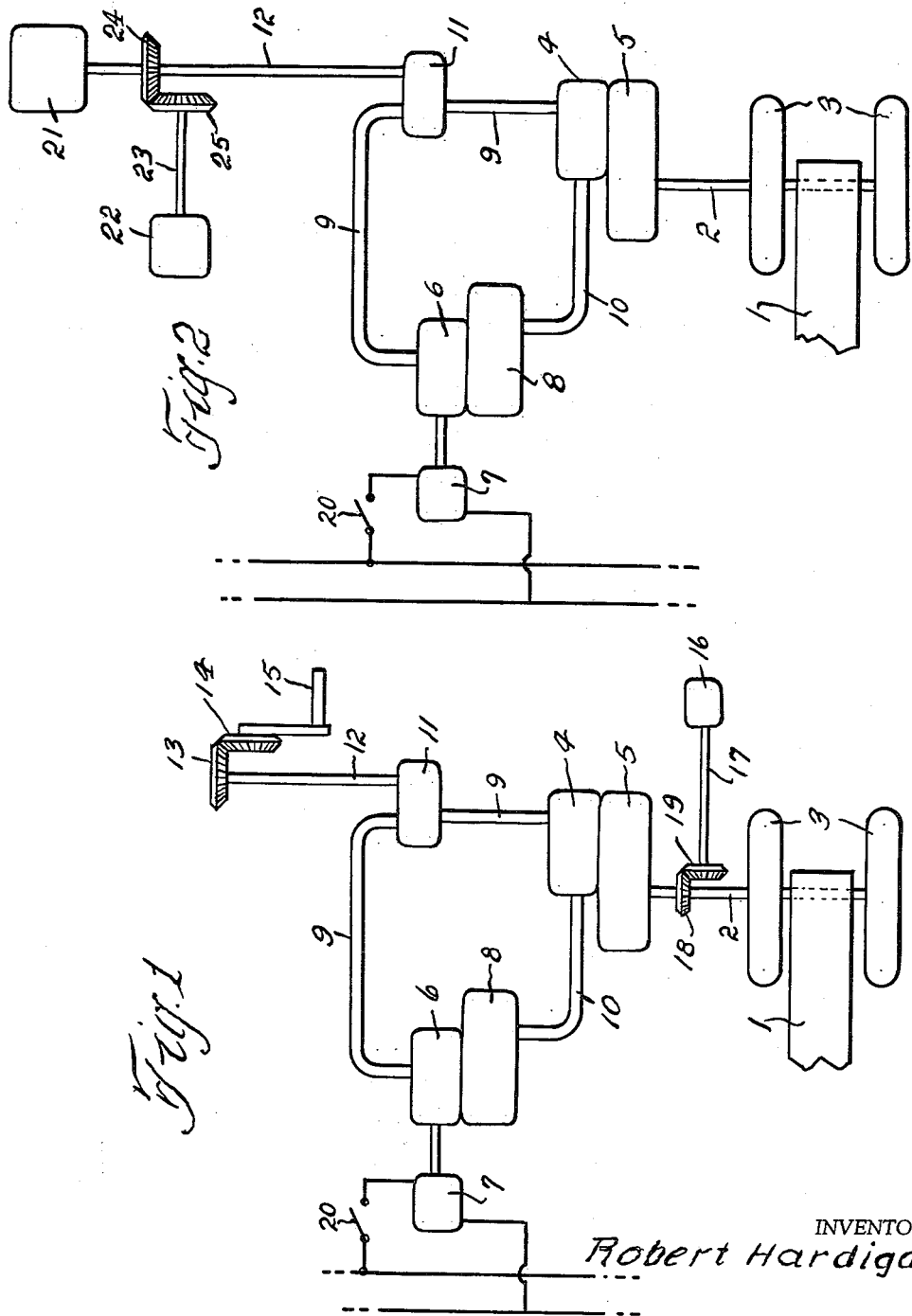
INVENTOR
Robert Hardigan
BY Borof & Borof
ATTORNEYS

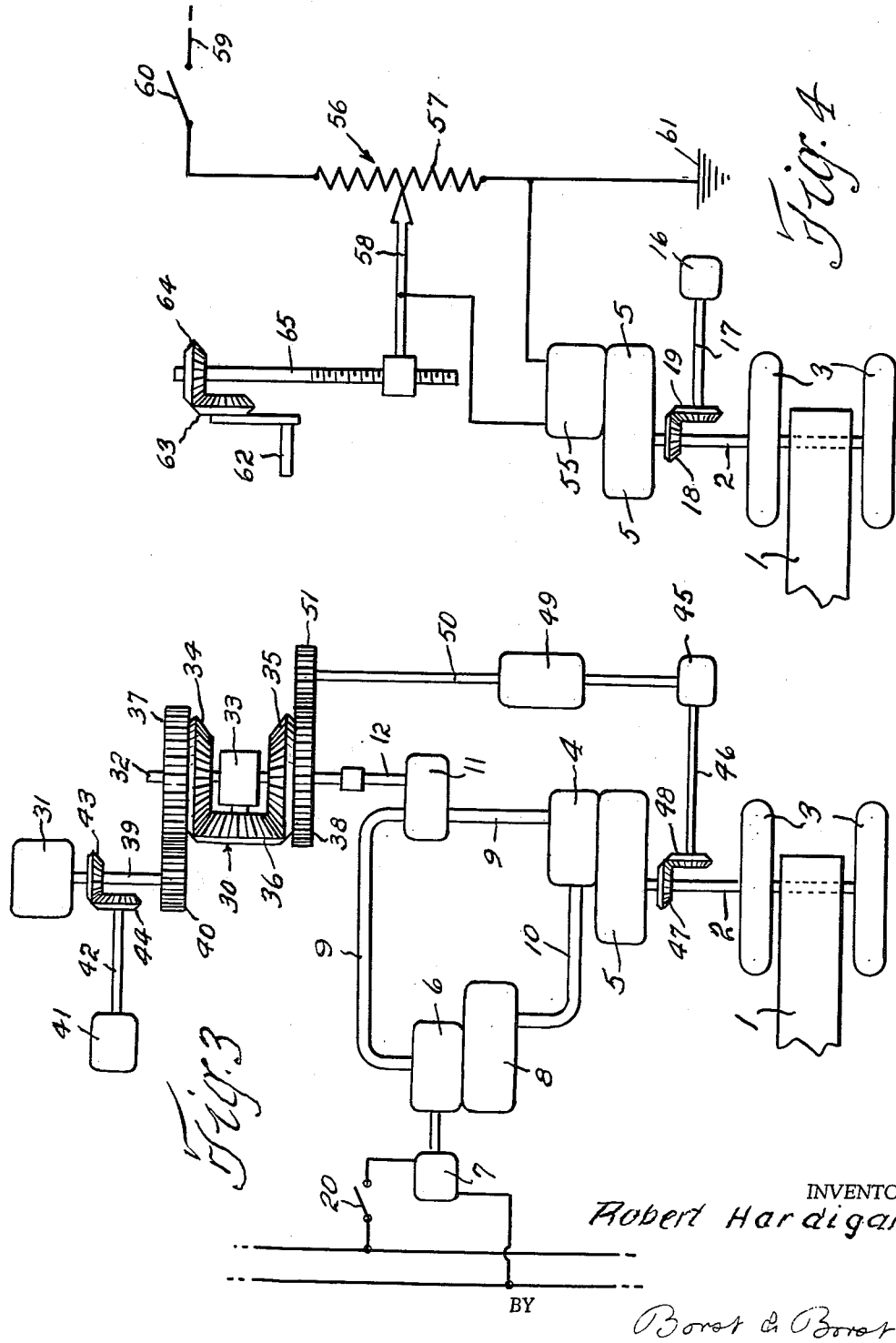

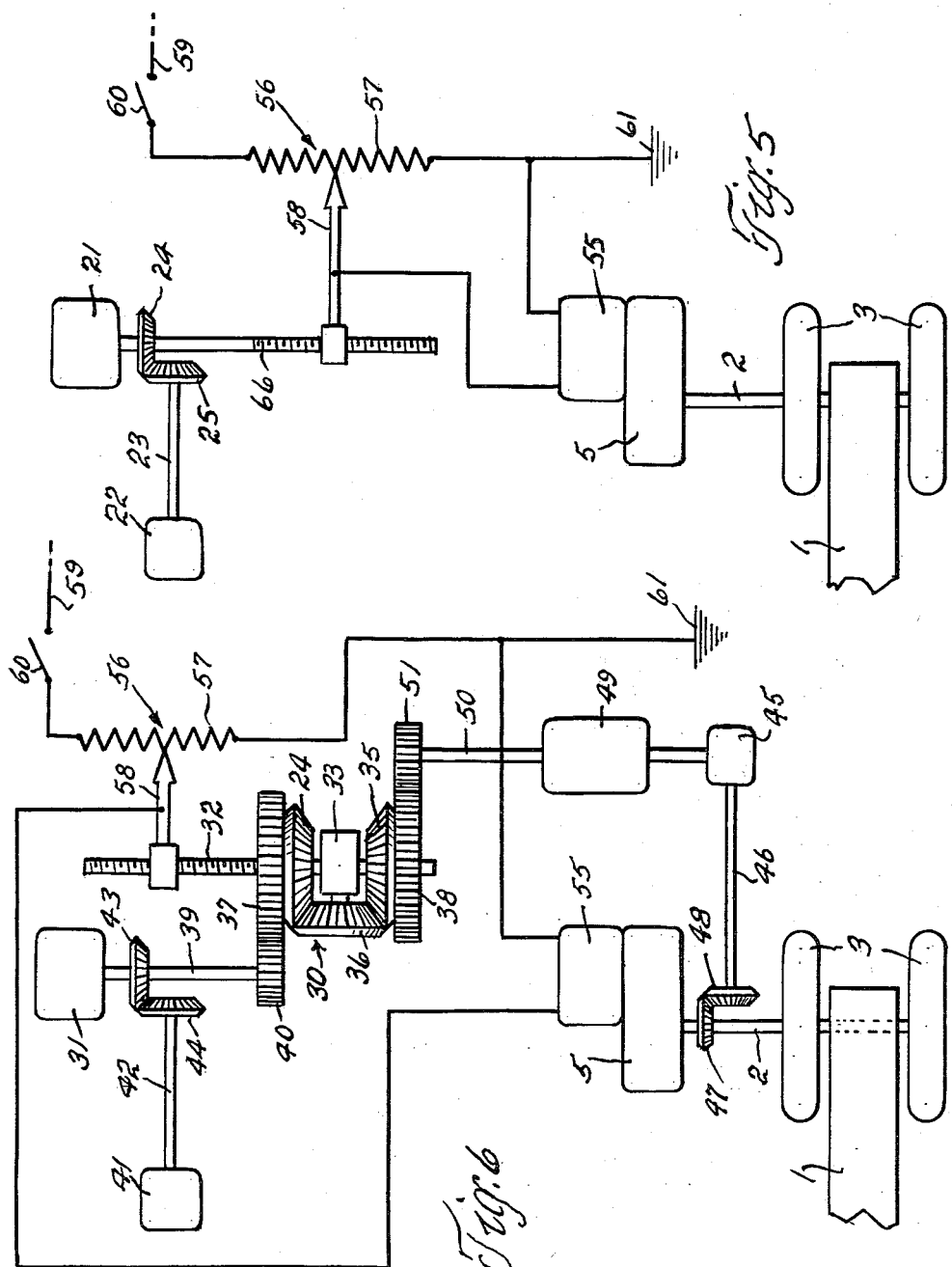

United States Patent Office 3,096,052
Patented July 2, 1963

---

3,096,052
PRE-SPINNING OF AIRCRAFT LANDING WHEELS
Robert Hardigan, Bronx, N.Y., assignor to Sperry Rand Corporation, Ford Instrument Company Division, Wilmington, Del., a corporation of Delaware
Filed Jan. 25, 1961, Ser. No. 84,800
9 Claims. (Cl. 244—103)

This invention relates to an improved landing gear apparatus for aircraft.

In most commercial and military aircraft the landing gear comprises at least one pair of spaced axially aligned landing wheels which are carried by suitable supporting mechanism by which they are retracted up into the fuselage of the aircraft during flight and are protracted down out thereof into ground engaging position just prior to landing. These wheels are provided with very expensive pneumatic rubber tires which are of a size and construction designed to support many tons of weight and to withstand terrific impact shocks during landing which are occasioned by the fact that the wheels are not turning at the time of touch down or ground contact. This results in a great deal of rubber being removed from the tires due to friction during the time it takes the wheels to achieve ground speed rotation, each landing thereof. The heat generated by this friction causes fast deterioration of the best constructed tires so that they have to be discarded and replaced with new tires after only a comparatively few landings, as otherwise the safe landing of the aircraft would be placed in jeopardy. Not only the tires but the entire landing gear apparatus is subjected to these shocks during landing due to the fact that the landing wheels are not rotating at touch down. If the aircraft landing wheels could be rotated, prior to touch down, at such r.p.m. that the peripheral speed thereof was equal to the ground speed of the aircraft during landing, this hazard would be eliminated and the tires would have a much longer life. Also, the shock sustained by the entire landing gear apparatus would be greatly minimized.

It is therefore the principal object of this invention to provide an apparatus by which the landing wheels of aircraft are rotated, prior to landing, at such r.p.m. that the linear speed thereof is equal to the ground speed of the aircraft at touch down.

Another object of the invention is to provide an apparatus, of the aforesaid character, which may be either manually or automatically controlled in accordance with the ground speed of the aircraft prior to and during landing.

Still another object of the invention is to provide an apparatus of the aforesaid character which is of simple construction and very efficient in operation.

The apparatus comprises generally a driving mechanism comprising a motor and a gear box, by and through which the landing wheels are rotated, and a control means by which the motor is controlled in accordance with the aircraft ground speed. The control means is adapted to be either manually or automatically set in accordance with the ground speed of the aircraft as it approaches landing.

The motor may be either hydraulic or electric and the gear box is a conventional type gear reduction box. When the motor is hydraulic the control means comprises a fluid flow control valve which may be manually opened and closed or may be automatically opened and closed by a standard ground speed computer which is operatively connected thereto. And when the motor is electric the control means comprises a conventional rheostat which is adapted to be either manually or automatically set in accordance with the ground speed of the aircraft prior to and during landing.

When the control means is automatically set by a ground speed computer the output of the computer is imparted to the control means through a conventional mechanical differential, and the r.p.m. output of the gear box is fed back to the differential through a standard conventional servomechanism. In this manner the actual set-in ground speed is always accurately maintained by the landing wheels. In all forms of the invention ground speed indicators and/or tachometers are provided.

Having stated the principal objects of the invention other and more specific objects of the invention will be apparent from the following specification and the accompanying drawings forming a part thereof in which:

FIG. 1 is a diagrammatic view illustrating one form of the invention in which the driving mechanism comprises a hydraulic motor and a fluid flow control valve, and in which the control valve is adapted to be opened and/or closed manually in accordance with a known ground speed of the aircraft;

FIG. 2 is a view similar to FIG. 1 in which the control valve is automatically opened and/or closed by a ground speed computer which is operatively connected thereto;

FIG. 3 is a view similar to FIG. 2 in which the output of the ground speed computer is imparted to the control valve through a conventional mechanical differential, and in which the output of the gear box is fed back to the differential through a conventional servo mechanism;

FIG. 4 is a diagrammatic view illustrating another form of the invention in which the driving mechanism comprises an electric motor and a control rheostat, and in which the rheostat is manually adjusted in accordance with a known ground speed of the aircraft;

FIG. 5 is a view similar to FIG. 4 in which the rheostat is automatically adjusted by a ground speed computer which is operatively connected thereto; and FIG. 6 is a view similar to FIG. 5 in which the output of the ground speed computer is imparted to the rheostat through a conventional differential, and in which the output of the gear box is fed back to the differential through a conventional servo mechanism.

The various forms of the invention, as shown in the drawings, will now be specifically described, reference being had first to FIGS. 1 to 3 inclusive of the drawings, in which is diagrammatically illustrated a hydraulic driving and control mechanism by which the landing wheels of an aircraft are adapted to be pre-spun at a speed equivalent to the ground speed of the aircraft. Referring now to the drawings, by reference characters, the numeral 1 indicates a supporting member which is adapted to have the upper end thereof connected to the underside of an aircraft. A shaft 2 is rotatably mounted in the supporting means 1 adjacent the lower free end thereof. A pair of rubber tired landing wheels 3 are secured to the shaft 2 for rotation therewith, one on each side of the supporting member 1. The shaft 2 is adapted to be rotated, and with it the landing wheels 3, at predetermined speeds, in accordance with the ground speed of the aircraft, by a standard hydraulic motor 4 through a conventional gear box 5 to which the shaft 2 is operatively connected. A pump 6. which is driven by an electric motor 7, forces fluid under pressure from an accumulator 8 through a conduit 9 and into the hydraulic motor 4. The fluid is returned from the hydraulic motor 4 to the accumulator 8 through a conduit 10. A fluid flow control valve 11 which is interposed in the conduit 9 between the pump 6 and the hydraulic motor 4, regulates the flow of fluid to the motor 4, in accordance with the setting or opening thereof, and thereby controls the speed of the motor 4 and consequently the r.p.m. of the landing wheels 3.

Various different actuating means, as shown in FIGS. 1, 2 and 3, may be employed to control the opening of the control valve 11 in accordance with the known ground speed of the aircraft. As shown in FIG. 1 this actuating means comprises a shaft 12 which had one end thereof operatively connected to the control valve 11 and has a bevel gear 13 secured to the other end thereof. The bevel gear 13 meshes with a bevel gear 14 which is provided with a crank 15 by which it is manually rotated. With this form of valve actuating means a tachometer 16, which is connected to the shaft 2 by a shaft 17 and a pair of meshing bevel gears 18 and 19, one of which is secured to the shaft 2 and the other of which is secured to the shaft 17, is provided for visually indicating the speed of the landing wheels 3.

After touch down the operation of the pump 6, and consequently the hydraulic motor 4, is stopped by opening the switch 20, which controls the energization of the pump driving electric motor 7. The gear box 5 and the motor 4 then act as an additional braking means in slowing down and stopping the movement of the aircraft during landing.

In FIG. 2 a slightly different actuating means for the fluid flow control valve is disclosed, which is adapted to automatically adjust the opening of the control valve 11. As shown therein a standard commercially available ground speed computer 21 which is connected to the shaft 12 automatically adjusts the opening control valve 11 in accordance with the ground speed computed thereby. With this form of actuating means an indicator 22, which is connected to the shaft 12 by a shaft 23 and a pair of meshing bevel gears 24 and 25 one of which is secured to the shaft 12 and the other of which is secured to the shaft 23, is provided for visually indicating the ground speed as computed by the computer 21.

FIG. 3 discloses another automatic actuating means, for the fluid control valve 11, which more accurately maintains the peripheral speed of the landing wheels 3 equivalent to the ground speed of the aircraft. As shown in FIG. 3 I interpose a conventional mechanical differential, generally indicated by the numeral 30, between the fluid flow control valve 11 and a standard commercial ground speed computer 31. The differential 30 comprises a spider shaft 32 having a spider 33 secured thereon. A pair of opposed bevel gears 34 and 35, which are rotatably mounted upon the spider shaft 32, one on each side of the spider 33, are geared together by a pinion gear 36 which is carried by the spider 33. The bevel gear 34 has a spur gear 37 secured thereto and the bevel gear 35 has a spur gear 38 secured thereto; and the spider shaft 32 is connected to the shaft 12 of the fluid flow control valve 11, through which the output of the differential 30 is imparted to the control valve 11. The output of the computer 31 is imparted to the differential 30 through the output shaft 39 of the computer 31, and a spur gear 40 which is secured to the shaft 39 in mesh with the spur gear 37 secured to the bevel gear 34 of the differential 30. An indicator 41, similar to the indicator 22 of FIG. 2 and which is connected to the shaft 39 by a shaft 42 and a pair of meshing bevel gears 43 and 44 one of which is secured to the shaft 39 and the other of which is secured to the shaft 42, is provided for visually indicating the ground speed of the aircraft as computed by the computer 31. A tachometer 45, similar to the tachometer 16 of FIG. 1, is connected to the shaft 2 by a shaft 46 and a pair of meshing bevel gears 47 and 48, one of which is secured to the shaft 2 and the other of which is secured to the shaft 46, for visually indicating the speed of the landing wheels 3 as rotated by the motor 4, gear box 5, and shaft 2. The output speed of the shaft 2 is fed back to the differential 30 through the gear 47 and 48, shaft 46, tachometer 45, conventional servomechanism 49, shaft 50 and a spur gear 51 which is secured to the shaft 50 in mesh with the spur gear 38 secured to the bevel gear 35 of the differential 30, to thereby always maintain the peripheral speed of the landing wheel 3 equivalent to the ground speed of the aircraft as computed by the computer 31. Otherwise this form of the invention is the same as that shown in FIGS. 1 and 2 and the same reference numerals are applied to like parts.

FIGS. 4, 5 and 6 disclose another form of the invention in which the landing wheels 3 are rotated through the gear box 5 and shaft 2 by an electric motor 55, the speed of which is controlled in accordance with the aircraft ground speed by a rheostat 56 having a coil 57 and an adjustable tap slider 58. On end of the rheostat coil 57 is connected to a current source 59 through a switch 60, and the other end thereof is connected to the ground as indicated at 61. FIG. 4 is similar to FIG. 1, FIG. 5 is similar to FIG. 2 and FIG. 6 is similar to FIG. 3, the only difference being that in FIGS. 1, 2 and 3 the driving and control means for the landing wheels 3 are hydraulic, and in FIGS. 4, 5 and 6 the driving and control means for the landing wheels is electric. Otherwise the construction and operation of the mechanism as shown in FIGS. 4, 5 and 6 is the same as that shown in FIGS. 1, 2 and 3, and the same reference numerals are applied to like parts. In FIG. 4 the control rheostat for the motor 55 is manually adjusted in accordance with a known ground speed of the aircraft by a crank 62 through meshing bevel gears 63 and 64 and a screw shaft 65 which is operatively connected to the tap slider 58 of the control rheostat 56.

In FIG. 5, which is similar to FIG. 2, the rheostat 56 is automatically adjusted by the ground speed computer 21 through a screw shaft 66 which is operatively connected to the tap slider 58 and to the computer 21. The ground speed indicator 22 is connected to the screw shaft 66 by the shaft 23 and the meshing bevel gears 24 and 25.

In FIG. 6, which is similar to FIG. 3, the spider shaft 32 of the differential 30 is operatively connected to the tap slider 58 of the rheostat 56. The output of the computer 31 is imparted to the differential 30 in the same manner as in FIG. 3, and the feedback signal from the shaft 2 is imparted to the differential as shown in FIG. 3.

From the foregoing it will be apparent to those skilled in this art that I have provided very simple and efficient means for accomplishing the objects of the invention.

It is to be understood that I am not limited to the specific constructions shown and described herein, as various modifications may be made therein within the spirit of the invention and the scope of the appended claims.

What is claimed is:

1. An aircraft landing gear mechanism of the character described comprising supporting means which is adapted to be secured to the underside of an aircraft, a pair of transversely spaced axially aligned landing wheels rotatably mounted on said supporting means, a gear box, power means by which said landing wheels are adapted to be rotated through said gear box at such r.p.m. that the linear peripheral speed thereof is equivalent to the ground speed of said aircraft, adjustable control means by which the speed of said power means is regulated, a mechanical differential, a ground speed computer, means by which the computed ground speed value is adapted to be imparted to said differential, a servo mechanism by which the output of said gear box is fed back to said differential, and means by which the output of said differential is imparted to said adjustable control means.

2. An aircraft landing gear mechanism as defined by claim 1 in which said power means comprises a hydraulic motor, and in which said adjustable control means comprises a fluid flow control valve.

3. An aircraft landing gear mechanism as defined by claim 1 in which said power means comprises an electric motor, and in which said control means comprises an adjustable rheostat.

4. An aircraft landing gear mechanism as defined by claim 1 in which said power means comprises a hydraulic motor, a power driven pump, an accumulator, conduit means through which fluid is forced under pressure by said pump from said accumulator to said hydraulic motor, and return conduit means between said hydraulic motor and said accumulator through which fluid is returned from said hydraulic motor to said accumulator, and in which said control means comprises a fluid flow control valve which is interposed in said conduit means.

5. An aircraft landing gear mechanism of the character described comprising supporting means which is adapted to be secured to the underside of an aircraft, a pair of transversely spaced axially aligned landing wheels rotatably mounted on said supporting means, a gear box, power means by which said landing wheels are adapted to be rotated through said gear box at such r.p.m. that the linear peripheral speed thereof is equivalent to the ground speed of said aircraft, adjustable control means by which the speed of said power means is regulated, a mechanical differential comprising, an output shaft operatively connected to said adjustable control means, a spider secured to said output shaft, a pair of spaced opposed similar bevel gears rotatably mounted on said output shaft one on each side of said spider, a rotatably mounted pinion gear carried by said spider in mesh with each of said bevel gears, a ground speed computer, means by which the output value of said computer is imparted to one of said bevel gears, and a servo mechanism by which the output of said gear box is fed back to the other of said bevel gears.

6. An aircraft landing gear mechanism as defined by claim 5 in which said power means comprises a hydraulic motor, and in which said adjustable control means comprises a fluid flow control valve.

7. An aircraft landing gear mechanism as defined by claim 5 in which said power means comprises an electric motor, and in which said control means comprises an adjustable rheostat.

8. An aircraft landing gear mechanism as defined by claim 5 in which said power means comprises a hydraulic motor, a power driven pump, an accumulator, conduit means through which fluid is forced under pressure by said pump from said accumulator to said hydraulic motor, and return conduit means between said hydraulic motor and said accumulator through which fluid is returned from said hydraulic motor to said accumulator, and in which said control means comprises a fluid flow control valve which is interposed in said conduit means.

9. An aircraft landing gear mechanism as defined by claim 7 in which said output shaft is exteriorly threaded, and in which said rheostat comprises a resistance coil and an interiorly threaded tap slider which is mounted on said exteriorly threaded output shaft and is adapted to be moved back and forth along said coil by the rotation of said output shaft.

References Cited in the file of this patent
UNITED STATES PATENTS

| | | |
|---|---|---|
| 2,315,501 | Crane et al. | Apr. 6, 1943 |
| 2,320,547 | Tiger | June 1, 1943 |
| 2,365,126 | Vickers | Dec. 12, 1944 |
| 2,554,590 | Peterson | May 29, 1951 |
| 2,923,000 | Wolinsky | Jan. 26, 1960 |